(12) United States Patent
Ankerhold

(10) Patent No.: US 7,613,371 B2
(45) Date of Patent: Nov. 3, 2009

(54) COUPLING OPTICAL FIBERS

(75) Inventor: Georg Ankerhold, Remagen (DE)

(73) Assignee: Fachhochschule Koblenz, Ramagen (DE)

( * ) Notice: Subject to any disclaimer, the term of this patent is extended or adjusted under 35 U.S.C. 154(b) by 0 days.

(21) Appl. No.: 11/864,378

(22) Filed: Sep. 28, 2007

(65) Prior Publication Data

US 2008/0118204 A1    May 22, 2008

(30) Foreign Application Priority Data

Oct. 5, 2006    (DE) .................... 10 2006 047 207

(51) Int. Cl.
  *G02B 6/26*    (2006.01)
(52) U.S. Cl. .............................. 385/25; 385/26; 385/55; 385/60
(58) Field of Classification Search ............ 385/53–84, 385/345; 356/345
  See application file for complete search history.

(56) References Cited

U.S. PATENT DOCUMENTS

| | | | | |
|---|---|---|---|---|
| 4,124,272 A | * | 11/1978 | Henderson et al. ............ | 385/26 |
| 4,373,779 A | * | 2/1983 | Dorsey ......................... | 385/26 |
| 4,643,521 A | * | 2/1987 | Harstead et al. ............... | 385/26 |
| 5,039,193 A | * | 8/1991 | Snow et al. .................... | 385/25 |
| 5,633,963 A | * | 5/1997 | Rickenbach et al. .......... | 385/25 |
| 6,069,698 A | * | 5/2000 | Ozawa et al. ................. | 356/511 |
| 6,532,839 B1 | * | 3/2003 | Kluth et al. .................. | 73/866.5 |
| 6,758,599 B2 | * | 7/2004 | Keselman et al. ............. | 385/55 |
| 6,817,257 B2 | * | 11/2004 | Kluth et al. ................. | 73/866.5 |
| 6,850,657 B2 | * | 2/2005 | Dhadwal et al. .............. | 385/12 |
| 7,214,122 B2 | * | 5/2007 | Hirokawa et al. .............. | 451/6 |
| 2007/0217736 A1 | * | 9/2007 | Zhang et al. .................. | 385/26 |

FOREIGN PATENT DOCUMENTS

| | | |
|---|---|---|
| DE | 2637448 C2 | 10/1977 |
| DE | 4208140 A1 | 9/1993 |
| DE | 19729978 A1 | 1/1999 |

* cited by examiner

*Primary Examiner*—Brian M. Healy
*Assistant Examiner*—Guy G Anderson
(74) *Attorney, Agent, or Firm*—Fish & Richardson P.C.

(57) ABSTRACT

A device and a method for the rotary coupling of optical fibers is disclosed. The coupling device includes a first housing element and a second housing element. The coupling device has a rotation axis around which the first and second housing element can rotate relative to each other. The device also includes a first fiber positioning element for the positioning of a section of a first optical fiber relative to the first housing element, a second fiber positioning element for the positioning of a section of a second optical fiber relative to the second housing element, and a fiber guiding body in which a fiber guiding capillary is constructed. The fiber guiding capillary extends continuously along the rotation axis from a first fiber insertion opening for the reception of an end section of the first optical fiber, to a second fiber insertion opening for the reception of an end section of the second optical fiber.

19 Claims, 6 Drawing Sheets

47 mm

COUPLING OPTICAL FIBERS

DESCRIPTION

Figure 1A:
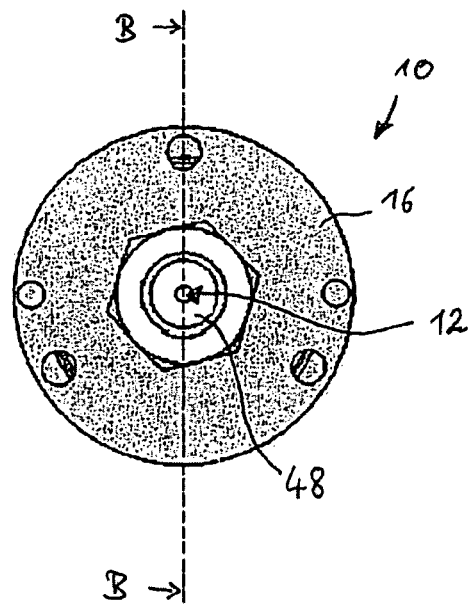

The present invention relates to a coupling device for optical fibers and, in particular, an optical rotary coupler with improved coupling properties.

Devices that allow the transfer of optical signals via a glass fiber between two rotating units have been known for a long time (see, e.g., U.S. Pat. No. 5,039,193), Since the time that glass fibers have been used widely in industry to transmit data streams at very high speeds, to create a galvanic decoupling between two electrical systems, or to guarantee by a purely optical construction a high protection against electrical interference radiation, again and again the problem emerged to also make an optical signal transfer between two rotating systems possible.

Optical rotary couplers have a broad spectrum of applications, for example, in the steel and paper industry, in manufacturing robots in the automobile industry, in radar and medical tomography systems, but also in many sensor applications where a high data transmission rate together with a high immunity to interference is required. In addition, it is important in the case of analog transmission of optical signals such as, e.g., in the case of sensor applications, to have an optical attenuation that is independent of the rotational motion as much as possible, in order to avoid an additional unwanted modulation introduced by the rotational motion.

In the case of optical rotary couplers the signal guidance takes place as a rule via rotating optical fibers. For lower data streams as a rule mechanical and optical insensitive multi-mode fibers are used, however, for high data rates as a rule single-mode fibers are used. The problem in the case of rotating single-mode optical fibers with a light conducting core diameter of, for instance, only about 9 μm is to ensure an optical transfer that is without attenuation as much as possible and that is to a high degree independent of the rotational motion and thus constant in time.

Typical transfer attenuations are in the range of approximately 2 to 2.5 dB in conventional systems. In addition to this, an additional rotation-angle dependent, varying optical attenuation with a minimum-maximum value in the range of about 1 dB shows up that causes an additional modulation of the optical signal in the course of the rotation. The strength of this modulation is in general described with the attenuation variance of the rotary coupler. For digital transfers with sufficiently high optical signal peaks this rotation dependent modulation in general does not have to be considered further. However, for a transfer of analog optical signals such as those, for example, in sensor applications, this effect proves not only to be extraordinarily inconvenient and disadvantageous, but in many cases also restrictive.

In order to transfer an optical signal from a rotating to a stationary fiber or between fibers that rotate with respect to each other, it must be taken into account that the light conducting core diameter of a single-mode fiber is only 9 μm and that the light exists with a relatively large angular field divergent from the fiber. A direct transfer from a rotating to an opposite stationary fiber end, or between fibers that rotate with respect to each other, is therefore difficult given the occurring mechanical oscillations, and is afflicted with large losses. A small axial distance as well as a slight lateral radial displacement of a few μm of two optical fibers that must be coupled already leads to considerable losses.

In conventional rotary couplers the light that exits a first optical fiber or glass fiber is therefore is spread out and collimated with a lens unit and is coupled by means of an opposite second lens into a second optical fiber or glass fiber. A typical function mode of an optical rotary coupler with collimation lenses is designed as follows: Light, that exits through a glass fiber, is spread out and sent to the rotating rotor. There a collimator that is rigidly attached to the rotor collects the light and couples it again into the likewise rotating glass fiber. The widening of the beam diameter prevents, in particular in the case of single-mode fibers with a core diameter of a few micrometers (typically approximately 9 μm), that small a mechanical imprecision or the smallest alignment change due to external vibrations or temperature effects, but also due to dust on the front side of the glass fiber, lead to a large optical transfer attenuation at the rotating interface.

Figure 9:
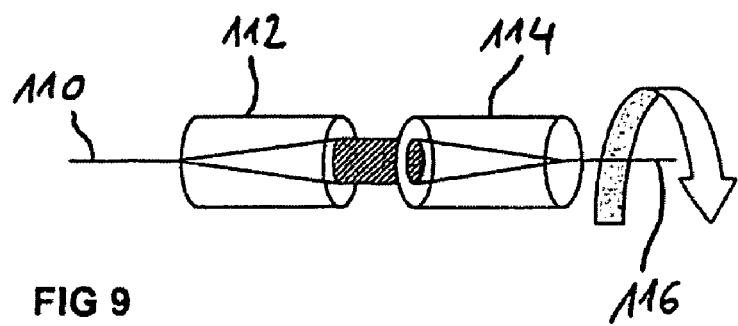

A typical design of a conventional optical rotary coupler for multi-mode and single-mode operation is depicted in FIG. 9. The light that is conducted through a first light wave conductor 110 is guided in collimation optics out of a, in the rotation axis lying, first graded refractive index lens 112 ("GRIN lens") and its beam diameter is there widened. After traveling a short distance of <1 mm, the light is captured by a second GRIN lens 114 that also lies in the rotation axis and is again coupled into a, preferably relative to the first light wave conductor 110 rotatable, second light wave conductor 116. The dimensions of the optical rotary coupler are small and very compact due to the utilization of GRIN lenses instead of ground quartz glass lenses.

Figure 10:
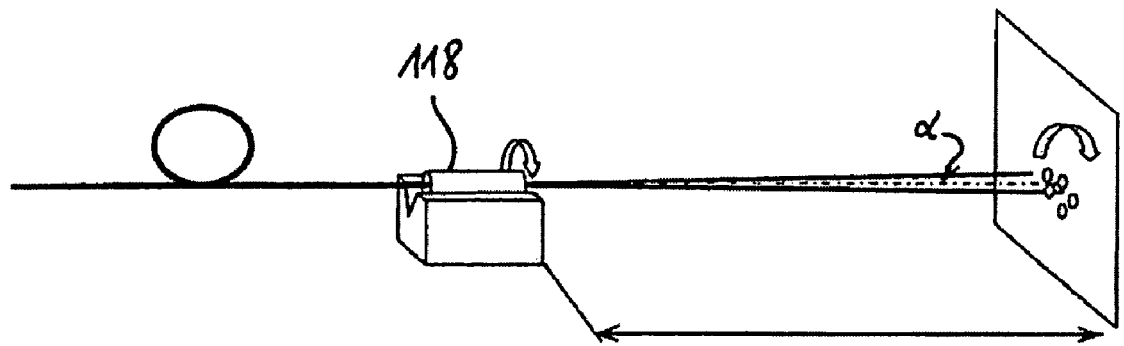

In order to avoid an expensive additional alignment of a rotary coupler that is equipped with GRIN lenses, high demands are imposed on the so-called "beam pointing stability" of the used GRIN lens collimators, see FIG. 10. By "beam pointing stability" one understands the angle α (so-called "swing angle") between the exiting light beam and the geometrical axis of a cylindrically symmetric GRIN lens collimator 118. The "beam pointing stability" together with the mechanical manufacturing tolerances determines the efficiency of the coupling of the transferred light and thereby the attenuation variance during rotation. In conventional rotary couplers this is typically about 1 to 2 dB.

It is necessary to provide the entry and exit surfaces of lenses with antireflection layers in conventional rotary couplers since otherwise strong back reflections occur. Such antireflection layers typically have a wavelength dependency and can mainly be optimized only for a certain wavelength (e.g., 1310 nm±20 nm or 1550 nm±20 nm). In addition, the small air gap between both lenses, into which air humidity or dust that interferes optically can penetrate, proves to be disadvantageous.

The task of the present invention is to produce a device and method for the rotary coupling of optical fibers with improved coupling properties, This task is according to the invention accomplished by means of a coupling device with the characteristics indicated in claim 1 and a method with the characteristics indicated in claim 15. Preferred embodiments of the invention are the subject of the dependent claims.

The present invention therefore provides a coupling device for optical fibers that comprises:

- a first housing element and a second housing element, whereby the coupling device has a rotation axis around which the first and second housing element can rotate relative to each other;
- a first fiber positioning element for the positioning of a section of a first optical fiber relative to the first housing element;

a second fiber positioning element for the positioning of a section of a second optical fiber relative to the second housing element; and a fiber guiding body in which a fiber guiding capillary, in particular for the intake of an immersion fluid, is constructed, whereby the fiber guiding capillary extends continuously along the rotation axis from a first fiber insertion opening, for reception of an end section of the first optical fiber, to a second fiber insertion opening for the reception of an end section of the second optical fiber.

In this way a simple as well as a very stable and reliable alignment of two optical fiber ends that have to be coupled is achieved. With this arrangement it is thus possible to achieve to a large extent a decoupling from external mechanical influences and occurrences of drift, which lead, in the case of conventional rotary couplers with lens unit, to undesirable high attenuation losses due to lateral relative displacements of the optical fiber ends against each other. An improvement of the coupling properties of a rotatable coupler of optical fibers is therefore achieved by the present invention. As optical fibers, in particular single-mode fibers and multi-mode fibers are suitable, among which are, in particular, grade refractive index fibers, step index fibers, hollow core fibers, and multi-core fibers from different materials such as, e.g., polymer optical fibers (synthetic or also "polymer optical fibers," e.g., POF fibers), fluoride fibers, or chalgonide fibers.

The fiber guiding capillary preferably contains at least partly an immersion fluid, in particular an immersion fluid with a tuned refractive index. In the ease of an immersion fluid that has a refractive index that is adjusted, the refractive index can deviate up to about +/−20%, preferably up to about +/−10%, from that of the optical fiber, in particular the fiber core. A too large difference between the refractive index of the optical fiber, in particular the fiber core, and the immersion oil leads to an increase of the optical transfer attenuation, in particular because of back reflection of light in the fiber.

One of the housing elements is preferably designed or usable as stator and the other as rotor. In an alternative embodiment both the housing parts are designed or usable as rotors.

The fiber guiding body is preferably connected to the first housing element and can be rotated together with the first housing element relative to the second housing element along the rotation axis.

The fiber guiding body is preferably designed as a one-piece component, in particular as a glass capillary tube. In a preferred embodiment the fiber guiding capillary has, at least partly, a circular cross section perpendicular to the rotation axis and with a diameter that corresponds, preferably, to the diameter of an inserted or to be inserted optical fiber. The diameter is very preferably approximately around 125 µm.

In an alternative preferred embodiment the fiber guiding capillary has, at least partly, a cross section perpendicular to the rotation axis that is hot circular. The fiber guiding capillary has preferably a cross section perpendicular to the rotation axis, that is different from the cross section of one the end sections of the optical fibers that is accommodated in the fiber guiding capillary.

In particular, the fiber guiding capillary has, at least partly or in sections, a cross section perpendicular to the rotation axis in such a way that, when an optical fiber with, in particular, a circular cross section perpendicular to the rotation axis, is inserted, a multitude of microchannels is created for the reception and/or the transport of a fluid, in particular, an immersion fluid between the optical fiber and the fiber guiding body, as well as a multitude of fiber guiding contacts in which the optical fiber is in mechanical contact with the fiber guiding body. The mechanical friction between the optical fiber and the fiber guiding body is in this way lowered in a very efficient manner while ensuring a good lateral guiding of the optical fiber in the fiber guiding capillary. The fluid, in particular the immersion fluid on the fiber guiding contacts, thereby preferably forms a lubrication between the optical fiber and the fiber guiding body.

The fiber guiding capillary preferably has a cross section perpendicular to the rotation axis that can be described, at least partly, by a polyline, in particular, a triangle, a square, or a, preferably regular, pentagon or hexagon, etc., in which a circle can be inscribed. In the region of the corners of the polyline thereby preferably microchannels form, while preferably each side of the polyline is in mechanical contact with the inserted optical fiber by forming a fiber guiding contact.

The fiber guiding capillary very preferably has, at least in a region or in sections, an essentially square cross section perpendicular to the rotation axis. Here the "essentially" square cross section means in particular a cross section whose periphery is for the most part described by a square, whereby, for example, in particular the corners also can be rounded or cut. The corners can be rounded or cut also when the periphery of the cross section essentially can be described by other polylines. The side length of the, preferably essentially square, cross section preferably corresponds essentially to the diameter of the optical fiber—very preferably/for instance, about 125 µm.

The cross section of the fiber guiding capillary preferably widens up to the first and/or second fiber insertion opening. In particular, the fiber guiding capillary is designed up to the first and/or the second fiber guiding opening essentially conically or funnel-shaped, whereby it in a central or average section has essentially an approximately constant crass section. The fiber guiding capillary preferably has an essentially constant cross section perpendicular to the rotation axis at a distance parallel to the rotation axis of at least about 3 mm, preferably at least about 5 mm, and, more preferably, at least about 10 mm, and, most preferably, at least about 20 mm.

The fiber guiding body is preferably supported by a reception sleeve by means of which the fiber guiding body is connected to the first housing element.

The first and/or second housing element form preferably a fluid reception space that is connected to the fiber guiding capillary for the fluid exchange or it encloses, or they enclose, the fluid reception space. Preferably at least one fluid channel is constructed in the first and/or the second housing element that connects the fluid reception space with at least one fluid injection opening that is accessible from the outside.

The first and the second housing elements preferably can be moved relative to each other in the direction parallel to the rotation axis (axially) approximately less than about 500 µm, more preferably approximately less than about 100 µm, and most preferably approximately less than about 25 µm. The length of the fiber guiding body parallel to the rotation axis is preferably in the range of approximately 1 mm to approximately 20 mm, very preferably in a range of approximately 2 mm to approximately 10 mm, even more preferably in a range less than approximately 5 mm, and most preferably approximately 4 mm.

The first and the second housing elements are preferably connected to each other via, at least, one roller bearing. Preferably, a driving device is arranged or constructed on the first and/or second housing element.

According to the present invention an improved rotatable coupler for optical fibers can therefore be made. Such a coupler comprises thereby preferably a coupling device according to the present invention or a preferred embodiment of it. In addition, the coupler comprises a first and a second optical fiber whose end sections are arranged in the fiber guiding capillary at a mutual coupling distance. The region between the end sections of the optical fibers in the fiber guiding capillary is thereby preferably filled with an immersion fluid.

In addition, the present invention provides a method for the rotatable optical coupling of a first optical fiber with a second optical fiber. The method comprises thereby the steps:

insertion of an end section of the first optical fiber through a first fiber insertion opening into a fiber guiding capillary that extends continuously from the first fiber insertion opening to a second fiber insertion opening; and insertion of an end section of the second optical fiber into the fiber guiding capillary through the second fiber insertion opening.

A secure lateral alignment of the fibers ends that have to be coupled is ensured by the guiding according to the invention of the optical fiber into the fiber guiding capillary. As an advantage, a beam widening is thus not necessary, contrary to conventional coupling methods. This creates a stable and rotatable coupling of the optical fibers inside the fiber guiding capillary which is in particular insensitive to external mechanical influences. Furthermore, a degradation of surfaces of, in particular, the optical fibers, is lessened by the construction of the optical coupler inside the fiber guiding capillary. Moreover, also the handling during the coupling is simplified by the method according to the invention since, for example, a delicate alignment is not necessary.

Therefore, ah optical coupling between the, each other facing, end surfaces of the optical fibers is designed inside the fiber guiding capillary preferably without the interposition of optical elements for light beam widening.

The fiber guiding capillary is preferably filled, at least in the region between the end sections of the optical fibers, with an immersion fluid whose refractive index is adjusted to the refractive index of a fiber core of, at least, one of the optical fibers. In the case of a refractive index adjustment, an adjustment of the refractive index of the immersion fluid is preferably in the region of about +/−20%, preferably of about +/−10%, of the refractive index of the optical fiber, in particular of its fiber core. The inventive method can be executed in principle without immersion fluid and, in particular, without index adjusted immersion fluid. The guiding according to the invention of the optical fiber into a fiber guiding capillary alone ensures a secure lateral and radial alignment of the fiber ends that have to be coupled. At least after preparation, in particular a corresponding polishing of the fiber ends, and a small distance of the fiber ends in the fiber guiding capillary, is a rotatable coupling created that is stable and, in particular, insensitive to external mechanical influences. In addition, the processing of the corresponding fiber, in particular the time consuming polishing of the fiber front surfaces, can be omitted when an immersion fluid with ah adjusted refractive index is used. Moreover, because of this reflections are efficiently suppressed, which increases the coupling efficiency still further.

The fiber coating is preferably removed at least partly in the end section of the first and/or second optical-fiber before it is inserted into the fiber guiding capillary. A single-mode fiber is very preferably used as a first and/or second optical fiber. The advantages of the reliable and stable coupling of the optical fibers according to the present invention are very clear in particular in the case of single-mode fibers that require a high precision in the coupling.

Figure 1B:
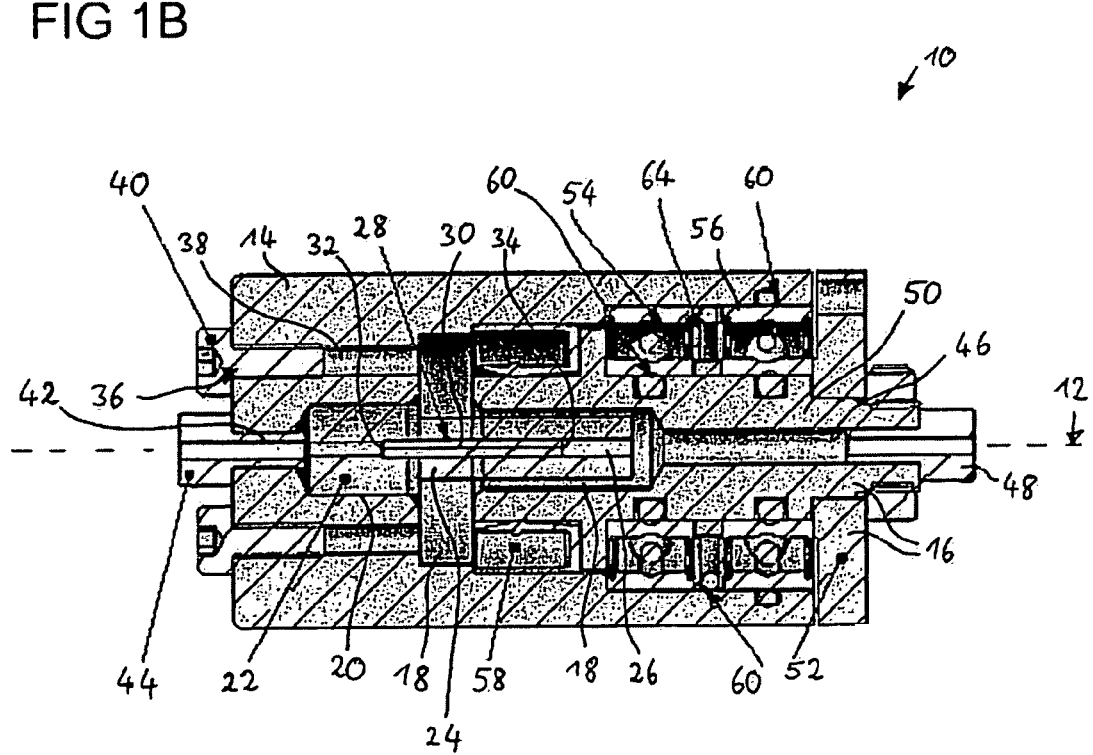
Figure 2:
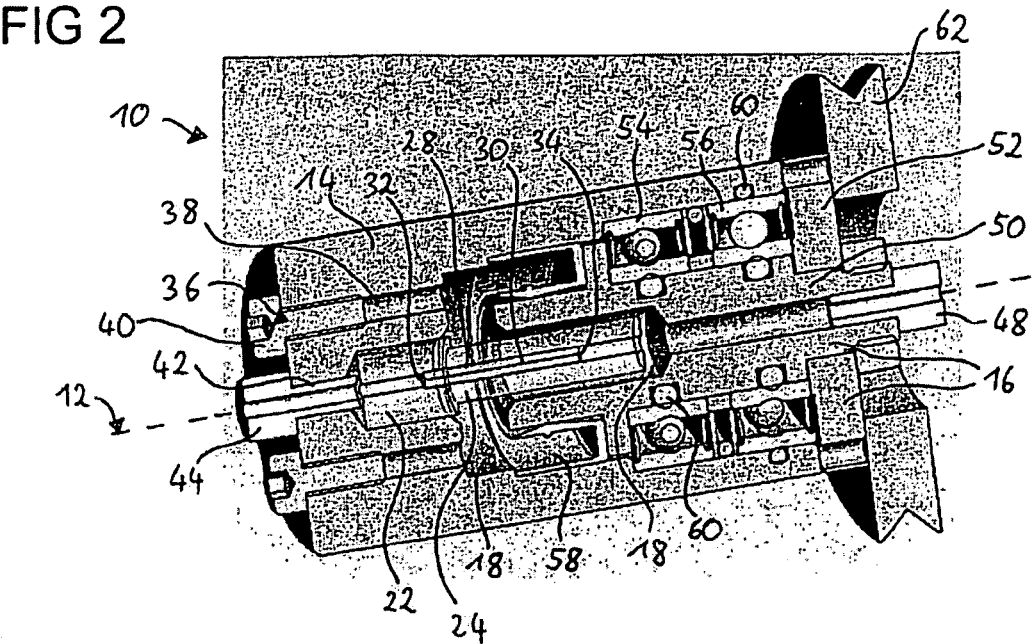
Figure 3:
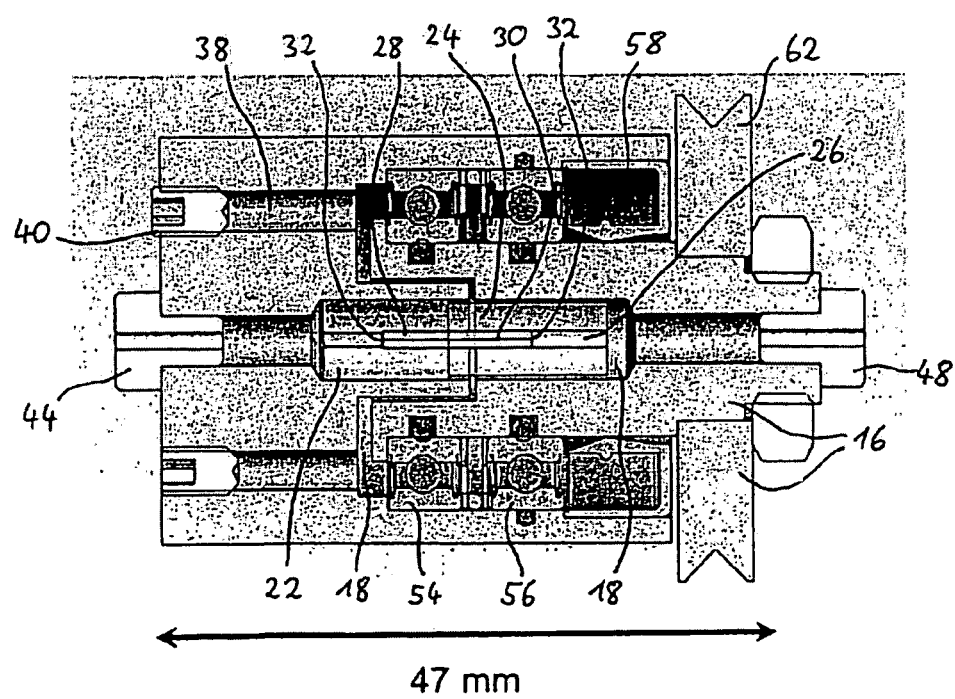
Figure 4A:
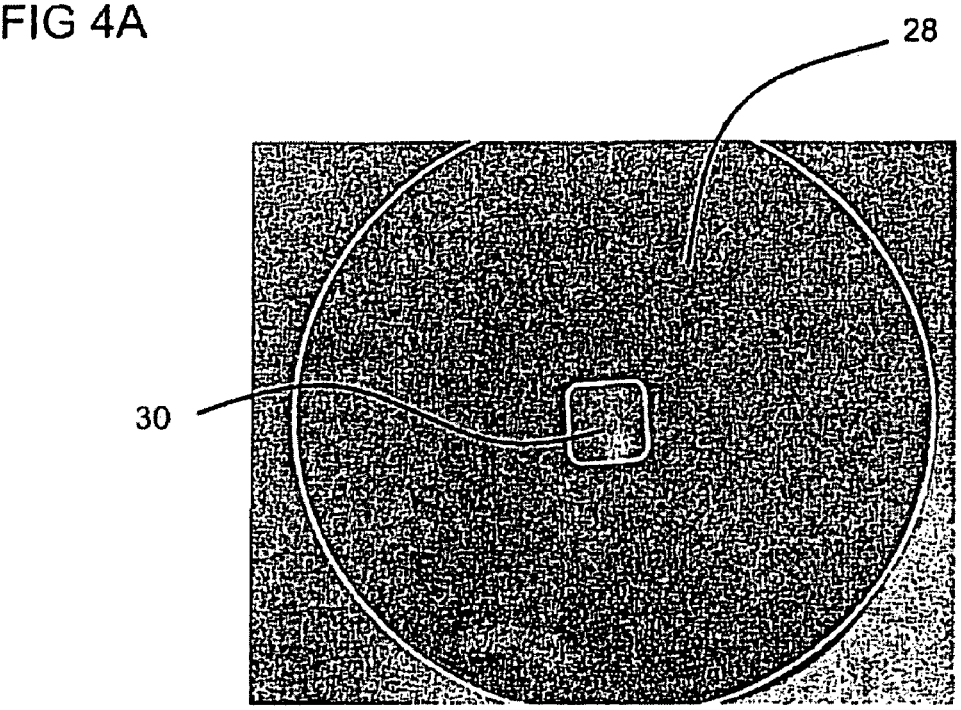
Figure 4B:
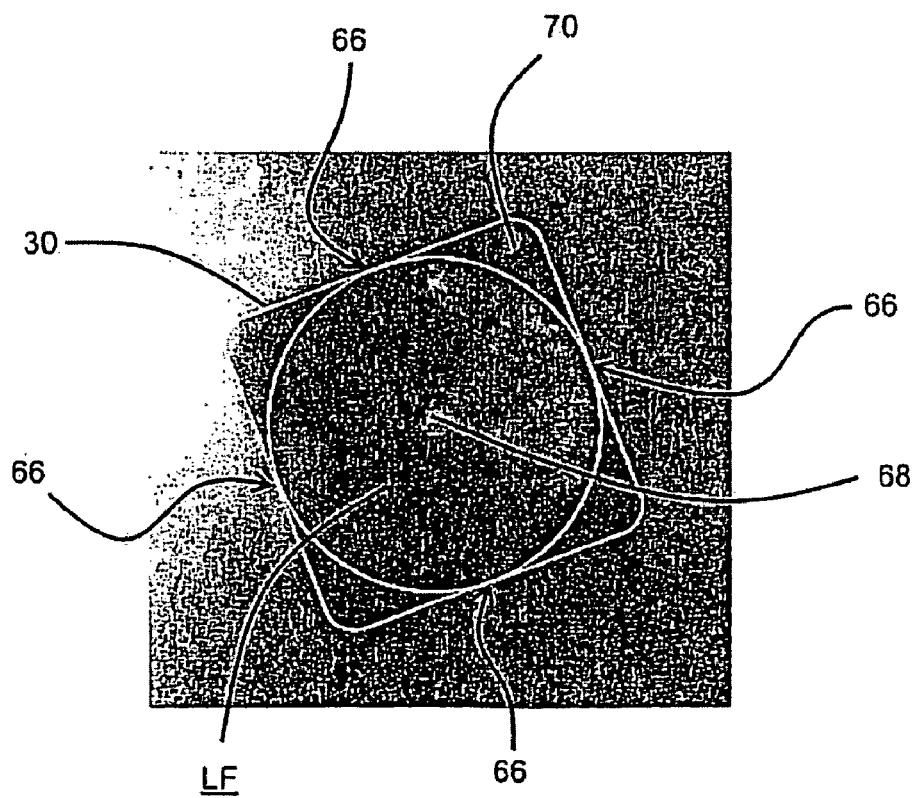
Figure 5:
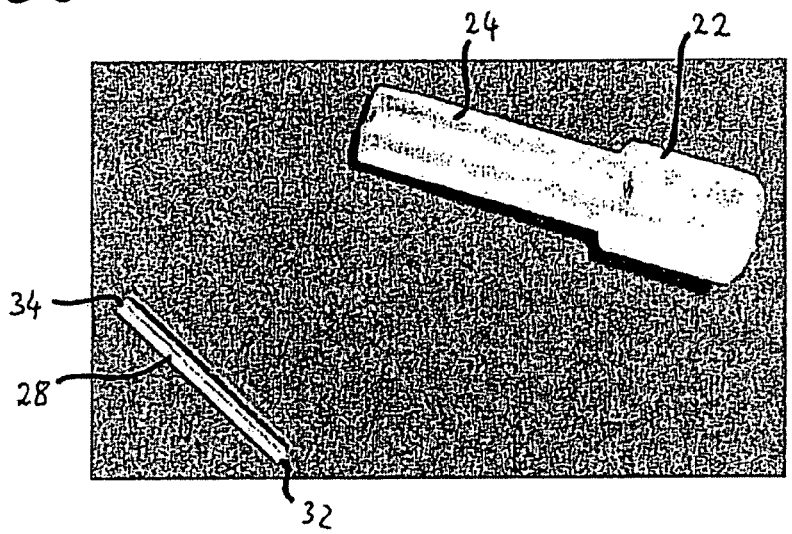
Figure 6:
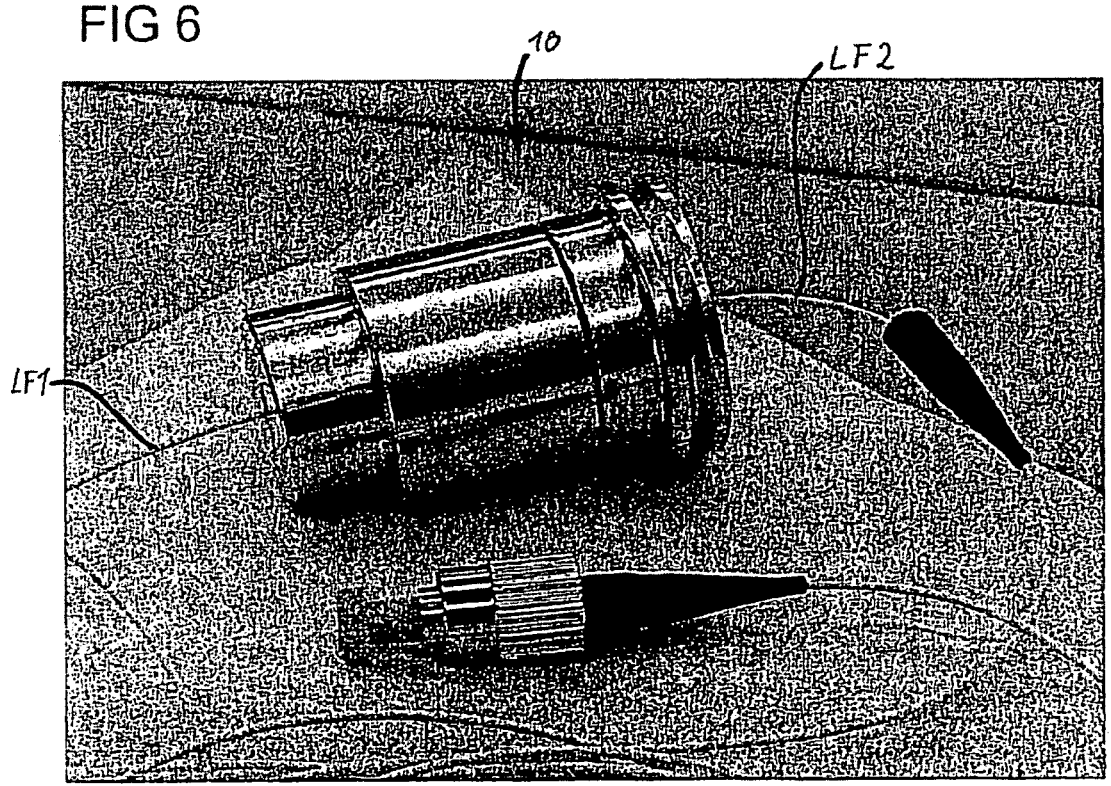
Figure 7:
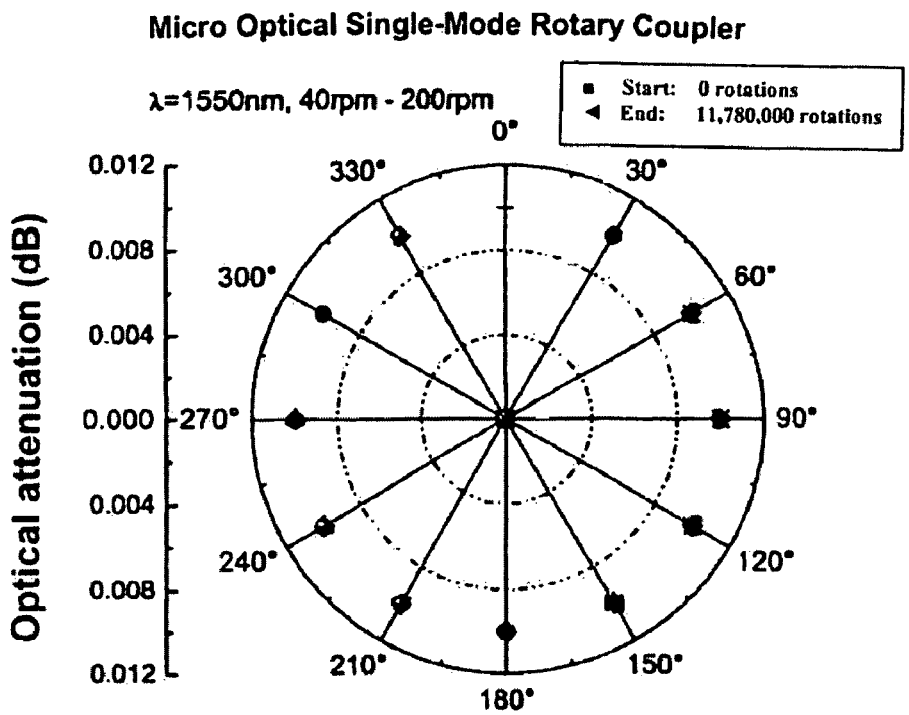
Figure 8:
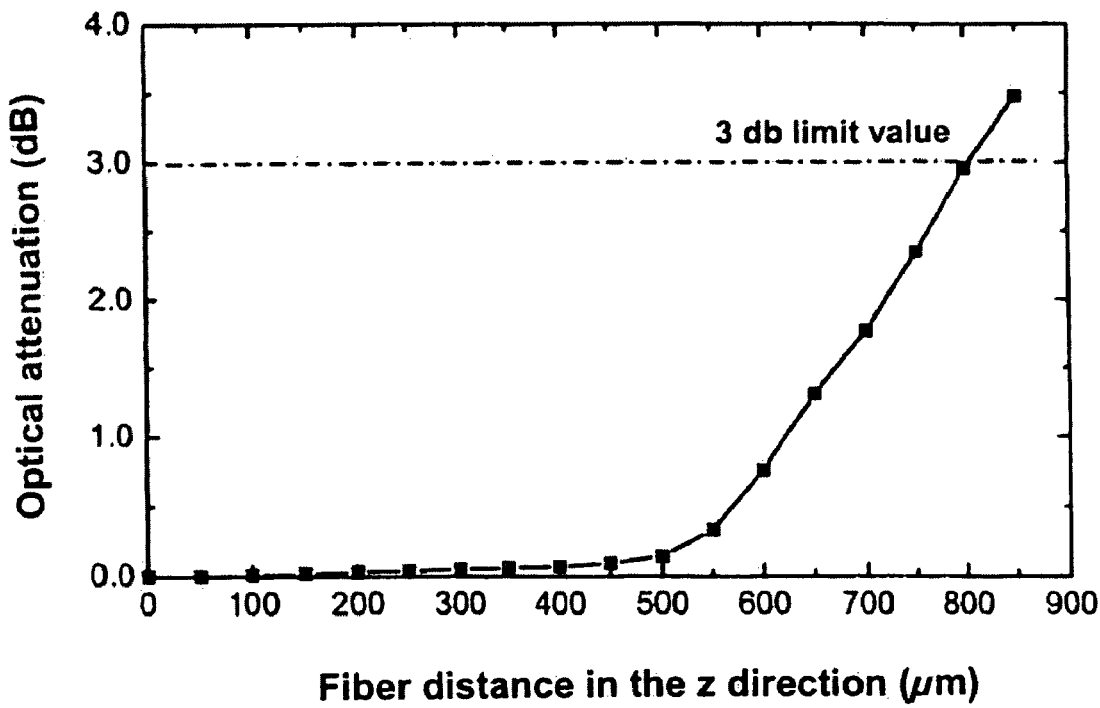

The invention is described in the following with reference to the accompanying drawings of preferred embodiments as examples. Even though embodiments are described separately, individual characteristics also of separately described embodiments can be combined into additional embodiments. The figures show:

FIG. 1A-1B: a schematic representation of a coupling device according to a first preferred embodiment of the present invention in a top view along the rotation axis (FIG. 1A) as well as in a cross section parallel to the rotation axis, whereby the hatching in FIG. 1B has no meaning;

FIG. 2: a perspective view of a coupling device according to a second preferred embodiment of the present invention;

FIG. 3: a schematic cross section of a coupling device according to an additional preferred embodiment of the present invention;

FIG. 4A: a photograph of a cross section view perpendicular to the rotation axis of a fiber guiding body of a coupling device according to a preferred embodiment of the present invention;

FIG. 4B: a photograph of an enlarged section of a cross section view according to FIG. 4A with an inserted optical fiber;

FIG. 5: a photograph of a fiber guiding body and a reception sleeve of a coupling device according to an additional preferred embodiment of the present invention;

FIG. 6: a photograph of a prototype of a coupling device according to a preferred embodiment of the present invention;

FIG. 7: a graphical representation of a measurement of the optical attenuation and the attenuation variance as result of a long duration test of a device according to the prototype of FIG. 6;

FIG. 8: a graphical representation of a measurement of the optical attenuation of the coupling as a function of the axial distance of the fiber ends;

FIG. 9: a schematic representation of the coupler of optical fibers by means of GRIN lens collimators in conventional rotary couplers; and FIG. 10: a schematic representation of the beam pointing stability of GRIN lens collimators.

FIG. 1A shows a schematic representation of a coupling device 10 according to a first preferred embodiment of the present invention in a top view along the rotation axis 12. FIG. 1B shows the coupling device 10 of FIG. 1A in a cross section along the plane B-B.

The coupling device 10 comprises in this embodiment a first housing element 14 and a second housing element 16 which can be rotated and swiveled relative to each other around the rotation axis 12. In the coupling device 10 a fluid reception space 18 is provided and defined, that is designed, as a hollow space inside the coupling device 10 and is preferably essentially enclosed by both the housing elements 14, 16 or is formed, at least partly, by both the housing elements 14, 16. In the first embodiment the first housing element 14 has preferably an adjustment cavity 20 into which a fitting element section 22 of a reception sleeve 24 is or can be inserted and/or fitted. The reception sleeve 24 is preferably connected to the first housing element 14 via the fitting element section 22. Preferably, a positioning and/or fixation of the reception sleeve 24 relative to the housing element 14 can thereby be achieved such that during the insertion as well as the utilization of the coupling device 10 an axial motion and/or rotational motion of the reception sleeve 24 relative to the housing element 14 is essentially prevented as well as suppressed, as well as inhibited.

In the reception sleeve 24 a reception channel 26 is constructed that extends at least partly along the rotation axis 12—in the shown preferred embodiment even over at least part of its whole length. The reception channel 26 has at least in regions or sections an essentially constant cross section perpendicular to the rotation axis 12. A fiber guiding body 28 is arranged in the reception channel 26 of the reception sleeve. A fiber guiding capillary 30 is constructed in the fiber guiding body 28, which extends continuously along the rotation axis 12 from a first fiber insertion opening 32, for reception of an end section of a first optical fiber, to a second fiber insertion opening 34 for the reception of an end section of a second optical fiber. The fiber guiding body 28 is preferably inserted as well as adjusted in such a way in the reception channel 26 of the reception sleeve 24, that thereby an axial motion (i.e., a motion parallel to the rotation axis 12) and/or a rotational motion (around the rotation axis 12) of the fiber guiding body 28 relative to the reception sleeve 24 and, very preferably, relative to the first housing element 14, in particular, during the insertion as well as the utilization of the coupling device 10, i.e., in the assembled and coupled state, is prevented or at least restricted.

The fiber guiding capillary 30 is preferably, at least via the second fiber insertion opening 34, connected to the fluid reception space 18, in particular for the fluid exchange. In this way a fluid (e.g., silicone oil type 1000) and, in particular, an immersion fluid, can flow from the fiber guiding capillary 30 into the fluid reception space 18 and/or from the fluid reception space 18 into the fiber guiding capillary 30. Preferably, in at least one of both housing elements 14, 16 at least one fluid filling opening 36 is constructed through which, from the outside of the coupling device 10, a fluid and in particular an immersion fluid, preferably an immersion fluid with an adjusted refractive index, can be filled into the fluid reception space 18. Here a fluid with an adjusted refractive index is a fluid of which the refractive index is in the range of approximately 80% up to approximately 120%, preferably from approximately 90% up to approximately 110%, of the refractive index of the optical fibers. In the shown embodiment at least one fluid filling opening 36 is constructed in the first housing element 14. Moreover, in the first housing element at least one fluid channel 38 is constructed that connects the fluid filling opening 36 to the fluid reception space 18. A fluid filling lock 40 is provided for the closing of the fluid filling opening 36.

A first fiber insertion channel 42 is designed in the first housing element 14 which makes a feed-through of the first optical fiber from outside the coupling device up to into the fiber guiding capillary 30 of the fiber guiding body 28 possible. The first fiber insertion channel 42 extends essentially along the rotation axis 12 in the represented embodiment. In an alternative embodiment the first fiber insertion channel 42 can also be at an angle with the rotation axis 12 that is different from 0°, in particular, it can even extend, at least partly, at an angle of 90° relative to the rotation axis.

A first fiber feed-through element 44 is arranged, at least partly, in the first fiber insertion channel 42. The first fiber feed-through 44 is preferably designed as a first fiber positioning element for the positioning of a section of a first optical fiber relative to the first housing element 14. The first fiber feed-through element 44 is preferably designed in such a way that it forms, at least partly, a form-fitted and/or force-closed contact with an external area as well as surface of the first optical fiber, in particular an external area as well as surface of a optical fiber jacket ("coating") of the first optical fiber. Thereby preferably at least one section of the first optical fiber, that is at least partly enclosed by the first fiber feed-through element 44, is positioned or fixated relative to the first housing element 14. In particular, preferably an axial motion of the first optical fiber and, in particular, of the end section of the first optical fiber that is inserted into the first fiber guiding capillary 30, is preferably prevented and suppressed or, at least, restricted. In addition, a leaking of a fluid and, in particular the immersion fluid, out of the inside of the coupling device 10 and, in particular out of the fluid reception space 18, is preferably prevented by a form-fitted feed-through of the first optical fiber by means of the first fiber feed-through element 44.

The second housing element 16 comprises, preferably similar to the first housing element 14, a second fiber insertion channel 46 which makes that a feed-through of a second optical fiber from outside the coupling device TO up and into the fiber guiding capillary 30 of the fiber guiding body 28 is possible. The second fiber insertion channel 46 extends essentially along the rotation axis 12 in the represented preferred embodiment. In an alternative embodiment, the second fiber insertion channel 46, in particular as has been already described for the first fiber insertion channel 42, can, at least partly, enclose an angle with the rotation axis 12 that is different from 0°. A second fiber feed-through element 48 is arranged in and/or on the second fiber insertion channel 46 and, in particular, in an outer end region of the second fiber insertion channel 46. The second fiber feed-through element 48 is preferably essentially structurally designed as well as arranged in the same way as the first fiber feed-through element 44. The second fiber feed-through element 48 very preferably is designed to enclose form-fitted and/or force-locked, at least partly, an outer area or surface of the second optical fiber and, in particular, an outer area or surface of an optical fiber jacket (coating) of the second optical fiber. The second fiber feed-through element 48 is preferably designed to position or fixate at least one enclosed section of the second optical fiber relative to the second housing element 16, i.e., to prevent, or at least restrict, its rotational motion and/or axial motion relative to the second housing element 16. The second fiber feed-through 48 is preferably designed as a second fiber positioning element for the positioning of a section of the second optical fiber relative to the second housing element 16. An axial motion of an end section of the second optical fiber that is inserted into the fiber guiding capillary 30, is thereby preferably prevented and suppressed, or at least restricted.

Different from the described embodiment, in another embodiment the first fiber positioning element and/or the second fiber positioning element can be designed as separate components independent from the first-fiber feed-through element 44 as well as the second fiber feed-through element 48. The first fiber positioning element and/or the second fiber positioning element is preferably arranged at or on the rotation axis 12. An axial motion of the end sections of the first as well as the second optical fiber that are inserted into the fiber guiding capillary 30 is thereby suppressed in a very efficient way.

The second housing element 16, shown in the embodiment of FIG. 1B, encloses a rotation insert 50 and a driver disk 52 that are preferably rigidly and force-locked connected to each other. The second housing element 16 can also be designed as one piece in an alternative embodiment. As shown in FIG. 1B, the first housing element 14 arid the rotation insert 50 of the second housing element 16, are connected to each other by means of one or more (e.g., as shown, two) deep-groove ball bearings 54, 56 in such a way that they can rotate. A very precise axial positioning of the first housing element 14 relative to the second housing element 16, and a small mechanical friction during the rotation of both housing elements with respect to each other, is thereby achieved. A shim ring 64 is arranged in between the deep-groove ball bearings 54, 56 for the precise fitting as well as positioning. A radial shaft seal ring 58 is arranged between the first housing element 14 and the second housing element 16 for the sealing of the fluid reception space 18. One or more ball bearings are running in the immersion oil in a, not shown, embodiment and then inserted outwards into the radial shaft seal ring, so that also a continuous lubrication of at least a part of the ball bearing takes place. Investigations have shown that this does not deteriorate the optical attenuation. Therefore also embodiments are possible in which ball bearings are completely or partly omitted and both the outer housing halfs are running on the thin film of immersion oil. For additional sealing one or more O-rings 60 are provided in clearances in the first housing element 14 as well as in the second housing element 16.

The coupling device 10, in particular the first housing element 14 and the second housing element 16, are designed preferably in such a way that the fiber ends of the optical fibers that have to be coupled are at a distance from each other in the fiber guiding capillary 30 that is preferably less than approximately 500 µm, more preferably less than approximately 250 µm, and most preferably less than approximately 100 µm. Preferably still, the distance between the fiber ends is in the range of approximately 100 µm up to approximately 500 µm.

FIG. 2 shows a coupling device 10 according to an additional preferred embodiment of the present invention. This coupling device 10 is essentially structurally similar to the described first embodiment, which is why here reference is made to the embodiments of FIGS. 1A and 1B. The same reference marks are used in FIG. 2 as in FIGS. 1A and 1B for the in essence identical as well as corresponding components. A drive disk 62 is arranged in FIG. 2 on the driver disk 52 of the second housing element 16, It serves as a drive element for the rotation of the second housing element 16 around the rotation axis. With it the second housing element 16 can be rotated around the rotation axis 12 by means of a belt. The first housing element 14 is preferably used as stator and the second housing element 16 preferably as rotor in the here shown embodiment.

FIG. 3 shows an additional coupling device 10 according to an additional preferred embodiment of the present invention. Again, in essence identical and comparable components are denoted with the same reference marks as in FIGS. 1A and 1B. Differences with the first shown embodiment lie in, among other things, the alternative arrangement of the roller bearing 54, 56 that connects the first housing element 14 with the second housing element 16 in such a way that it can rotate, and in the alternative arrangement of the radial shaft seal ring 58. Moreover, the driver disk 62 in the embodiment, represented in FIG. 3, is directly designed as a drive disk that can be made to rotate by means of a drive belt. As FIG. 3 shows, the coupling device 10 has in the axial direction preferably a length of several 10 mm arid in the shown example a length of preferably less than 50 mm, in particular a length of approximately 47 mm.

FIG. 5 shows in a photograph the pictures of a reception sleeve 24 and a fiber guiding body 28 according to a preferred embodiment of the present invention. The reception sleeve 24 thereby comprises a fitting section 22 with a cross section perpendicular to the rotation axis 12 that is larger than the cross section of the remaining reception sleeve 24. A good mechanical connection between the reception sleeve 24 and the first housing element 14 is achieved with it. The reception sleeve 24 is preferably made from plastic. The fiber guiding, body 28 has preferably a glass capillary tube. The fiber guiding body 28 preferably has along the rotation axis 12 over its total length an essentially constant circular cross section perpendicular to the rotation axis 12. Correspondingly, the reception channel 26 that is constructed in the reception sleeve 24 also has an in essence constant circular cross section perpendicular to the rotation axis, at least partly, along the rotation axis 12, whereby the diameter of the reception channel 26 corresponds in essence to the outer diameter of the fiber guiding body 28.

In a method for the rotary coupling of optical fibers or glass fibers according to a preferred embodiment of the present invention, the first and the second optical fibers LF1, LF2, or glass fibers, are freed over a length of several millimeters from the optical fiber jacket (coating), in particular a protective plastic coating, and each is inserted via the first fiber insertion opening 32 or the second fiber insertion opening 34, respectively, into the fiber guiding capillary 30 of the fiber guiding body 28. The fiber cladding that surrounds the light conducting fiber core becomes always exposed during the removal of the optical fiber jacket (coating). The total diameter of the optical fiber that is free from the optical fiber jacket is thereby, for example, approximately around 125 µm. The fiber guiding capillary 30 preferably has such a cross section perpendicular to the rotation axis 12 that it can take in an optical fiber with, in particular, a circular cross section and a maximum diameter that corresponds to the diameter of the optical fibers that have to be coupled. In particular, the fiber guiding capillary 30 can have an in essence circular cross section perpendicular to the rotation axis 12 with an inner diameter that corresponds to the outer diameter of the optical fibers that have to be coupled.

FIG. 4A shows a photograph of a cross section of the fiber guiding body 28 according to a preferred embodiment of the present invention in a plane perpendicular to the rotation axis 12. The fiber guiding body 28 is preferably designed as a glass capillary tube with an in essence circular cross section perpendicular to the rotation axis 12. As is shown in FIG. 4A, the fiber guiding capillary 30 is constructed along the rotation axis 12 in the fiber guiding body 28. To improve the clarity, the contour of the fiber guiding body 28 as well as the contour of the fiber guiding capillary 30 are every time highlighted by a white line in FIG. 4A. The reception channel 30 has an in essence square cross section perpendicular to the rotation axis 12 in the shown preferred embodiment. The side length of the square cross section thereby corresponds preferably to the diameter of the optical fibers that have to be coupled. FIG. 4B shows a photograph of an enlarged section of the region near the axis of a fiber guiding body 28 similar to the fiber guiding body 28 represented in FIG. 4A. The in essence square cross section of the fiber guiding capillary 30 perpendicular to the rotation axis 12 can be seen there. To improve the clarity, the contour of the fiber guiding capillary 30 as well as the contour of an optical fiber LF inserted into it, are every time highlighted by a white line in FIG. 4B.

An optical fiber is inserted into the fiber guiding capillary 30 with a diameter that corresponds in essence to the side length of the in essence square cross section of the fiber guiding capillary 30. A good lateral guidance of the optical fiber LF is thereby achieved, i.e., an undesired motion as well as displacement of the optical fiber LF in a direction perpendicular to the rotation axis 12 is prevented by the formation of fiber guiding contacts 66 between the surface of the optical fiber LF and the inner surface of the fiber guiding capillary 30. It is in particular desirable to prevent such a lateral motion to such an extent that it is smaller than the diameter of the fiber core 68 of the optical fiber LF. In this way two ends of two optical fibers LF that have to be coupled can be centered robustly and reliably with respect to each other in the lateral direction. In the case of a non-circular design of the cross section of the fiber guiding capillary 30, as in the shown embodiment, microchannels 70, into which a fluid and, in particular, an immersion fluid can be guided, are created between the inner wall of the fiber guiding capillary 30 and the surface of the optical fiber LF. It is thereby very preferred that a fluid is used as immersion fluid that has a refractive index that corresponds to the refractive index of the fiber core 68 for, at least, one light wavelength that is to be transferred (with an allowed deviation of approximately 20%, preferably of approximately 10%) and that in addition is suitable for restricting the sliding friction between the optical fiber LF and the inside wall of the fiber guiding capillary 30, in particular the sliding friction at the fiber guiding contact 66. It is thus in particular preferred to use a lubricating fluid as immersion fluid. In the choice of the immersion fluid attention is preferably paid to that the physical properties such as, e.g., the viscosity upon temperature changes in a temperature range preferably between −40° C. and +85° C., remain preserved to a high degree and that, in particular, no freezing occurs. As immersion fluid preferably a silicone oil (e.g., type 1000) or a fully synthetic motor oil (e.g., Castrol) is used. A fully synthetic motor oil as immersion fluid has the advantage that its chemical and physical properties are well-known for a large temperature range. Besides fully synthetic motor oil also other fluids with a similar or adjusted refractive index can be used. For special applications also water is conceivable, however, there are limitations in applicability, on the one hand, due to the potential ice formation and, on the other, due to the fiber damaging effect of the OH ions. "Silicone oil" appears to be very particularly advantageous as immersion fluid. It is important, in order to employ the rotary coupler in particular at very low ambient temperatures, that the temperature dependent viscosity of the immersion oil does not become too large arid that the danger of fiber fractures can be avoided effectively. Different silicone oils have proven to be advantageous hereby since different silicone oils are available with different properties, in particular, with different gradations of the so-called "pour point" at which the fluid solidifies and thus gives rise to an increased danger of fiber fracture. If one chooses the silicone oil from the so-called "M class," in particular with the trademark specific reference "M5," the pour point lies approximately at −100° C. When silicone oil of class M5 is used the optical rotary coupler can be used with this immersion oil in a temperature range that can be near this very low temperature. In other words, it is advantageous to select the immersion fluid in such a way that its refractive index is adjusted to that of the optical fiber and/or that the temperature range in which the rotary coupler is used lies above the pour point of the immersion fluid.

The immersion fluid is preferably guided into the fiber guiding capillary 30 before the end sections of the optical fibers are inserted into the fiber guiding capillary 30. Due to the formation of microchannels, the driven out immersion fluid can subsequently exit via the microchannels 70 from the fiber guiding capillary during the insertion of the optical fibers LF. In order to further simplify the insertion of the optical fibers LF into the fiber guiding capillary 30, the cross section of the fiber guiding capillary 30 widens up to the end of the guiding body, thus up to the first fiber insertion opening 32 as well as up to the second fiber insertion opening 34. The fiber guiding capillary 30 is thus designed tapered (in particular, conical or funnel-shaped) in the region of the first fiber insertion opening 32 and/or in the region of the second fiber insertion opening 34.

In a method for the coupling of optical fibers LF according to a preferred embodiment of the present invention, the plastic jacket (fiber coating) is removed over a length of several millimeters on each end of both optical fibers or light wave conductors or glass fibers, in particular, single-mode fibers, so that the light conducting fiber core with the surrounding cladding is exposed. The total diameter of the high refractive fiber core and the low refractive cladding is thereby preferably about 125 μm. In order to produce an optical connection between two optical fibers that can rotate relative to each other, preferably both fiber ends are inserted into a glass capillary filled with an immersion fluid with a length preferably of approximately 4 mm and with an inner diameter of 125 μm. In order to facilitate the threading of the fibers, it is advantageous to construct both ends of the capillary tube in the shape of a funnel and taper them at the coupling location to the diameter of the optical fiber. A so-called refractive index adjusted medium is preferably used as immersion fluid whose refractive index corresponds, at least approximately, to that of the high refractive fiber core. The capillary tube creates thereby a precise fiber guidance for the, relative to each other, rotatable and/or rotating optical fibers, in particular for a rotating and a stationary single-mode optical fiber which are optically connected by means of the immersion fluid. With this arrangement it is possible to achieve to a large extent a decoupling from external mechanical influences and occurrences of drift, which lead in the case of conventional rotary couplers with lens unit to undesirable high attenuation losses due to lateral relative displacements of the optical fiber ends against each other.

Furthermore, if the cross section area of the capillary 30, that preferably encloses round fibers LF in a flush manner, is designed, for example, essentially square (cf. FIG. 4B), then mechanical friction is minimized in addition and very high rotational speeds are thus possible. The immersion fluid can enter and exit through the four microchannels 70 that are created at the sides, which clearly facilitates the assembly of the optical rotary coupler as well as advantageously makes a good and reliable lubrication between fiber LF and capillary 30 at the contact points 66 possible.

Three micro optical rotary couplers were constructed with a, in FIG. 6 as photograph depicted, prototype of a coupling device 10 according to a preferred embodiment of the present invention, and investigated in long time tests under different ambient conditions. The rotational speed was systematically increased from 40 rpm to 200 rpm, the relative air humidity was varied from 0 to 100%, and the temperature was lowered in steps from 80° C. to −5° C. The results showed that even after 12 million rotations the optical transfer attenuation constant was less than 0.01 dB with a variance that is smaller than 0.004 dB, as FIG. 7 depicts. FIG. 7 shows the long time behavior of the micro optical rotary coupler, whereby the angle dependent attenuation is shown at the beginning of the test and after 11,780,000 rotations. A degradation of the rotary coupling was not observed for the different operation parameters.

The present invention is thus suitable in particular for the application to the optical transfer of analog signals, e.g., in sensor applications where a rotation angle dependent attenuation is very critical as well as hindering.

The only possible translation motion of the optical fibers in the capillary tube is along the rotation axis 12 (z axis). In the case that the distance between both fiber ends changes this can lead to a change of the optical attenuation. It is therefore important to determine the dependency of the transfer attenuation on the distance between both fiber ends in the mechanical design of a rotary coupler as well as a coupling device 10.

Experiment shows that, even for a fiber distance of approximately 500 μm, the optical attenuation of a rotary coupler according to a preferred embodiment of the present invention, in which in particular the intermediate space between the fiber ends is filled with an immersion fluid, still lies way below the 3 db limit value that is usually is given for conventional rotary couplers. The dependency of the optical transfer attenuation of the coupling of two optical fibers on the distance, between both fiber ends in the fiber guiding capillary 30 is depicted in FIG. 8. The experimental data show that the fiber guiding capillary 30, that is filled with a refractive index adjusted immersion fluid, can optically compensate for a fiber distance up to 500 μm with a transfer attenuation that remains essentially constant. Due to the interplay between the precise lateral fiber guidance by means of the fiber guiding body, on the one hand, and the refractive index adjusted immersion fluid, which makes a light signal transfer between both the fiber ends possible without disturbing reflection arid scattering effects, an improved transfer can be achieved with the present invention while at the same reducing the requirements on the manufacturing tolerances of a rotary coupler. The 3 dB reference point is for this preferred embodiment of the present invention approximately around 800 μm and is thus clearly outside the usual mechanical tolerance range. Advantageously, harrow manufacturing tolerances of the rotary coupler, in particular the rotary coupler housing element as well as its rotatable bearing, are therefore not required.

The method according to the invention can in principle be carried out without immersion fluid and, in particular, without index adjusted immersion fluid. The guiding according to the invention of the optical fiber into a fiber guiding capillary alone ensures a secure lateral alignment of the fiber ends that have to be coupled. At least after preparation as well as processing of the fiber(s), in particular a corresponding polishing of the fiber end surfaces, and a small distance between the fiber ends in the fiber guiding capillary, is a rotatable coupling created that is stable and, in particular, insensitive to external mechanical influences.

However, the time consuming polishing of the fiber front surfaces can be omitted when an immersion fluid with an in essence adjusted refractive index is used. As the experiments showed, the fluid remains securely between both the fiber ends also after several million rotations, in particular because of adhesive forces. Spectral limiting antireflection layers of optical components are, in particular when an index adjusted immersion fluid is used, not necessary. The present invention can be employed over a broad wavelength range, in particular when an immersion fluid is used, since the dispersion and the absorption of an appropriate immersion fluid is small in the technologically interesting range of 800 to 1,600 nm. It is thus possible to transfer multiple laser wavelengths, at the same time in order to achieve in total an increase of the data transfer rate. Advantageously, with at least one optical fiber also very many wavelengths can be transferred essentially simultaneously, which is used, e.g., in telecommunication applications to increase the data transfer rate with the so-called wavelength division multiplexing (WDM). It is advantageously possible to transfer a very broad spectral range—thus many different wavelengths simultaneously—in the immersion oil coupling. This is done in such a way that the wavelength dependency, or also the "dispersion" of the fiber core, and the immersion fluid is similar and/or no significant light absorption by the coupling fluid occurs. The spectral application range of an optical rotary coupler is advantageously not limited, whereby an index adjusted immersion fluid is preferably used for the utilized optical fiber. Also, for example, in the ultraviolet spectral range for wavelengths smaller than approximately 390 nm different fiber based sensor applications are known in which an optical rotary coupler can be used if needed.

The total costs are, compared to the previous rotary couplers with antireflection-layered imaging lens unit, considerably less, due to the utilization of inexpensive glass capillaries with a square or essentially square internal profile. Dewing and contamination of optical areas is considerably reduced, in particular by the accommodation of the fiber ends inside the fiber guiding capillary. Finally, a micro optical design of the coupling device according to the present invention permits in a simple way a miniaturization and can be used for multimode fibers as well as also for single-mode fibers. As optical fibers in particular single-mode fibers and multi-mode fibers are suitable, among which are, in particular, grade refractive index fibers, step index fibers, hollow core fibers, arid multi-core fibers from different materials such as, e.g., polymer optical fibers (synthetic or also POF fibers), fluoride fibers, or chalgonide fibers.

The coupling device for optical fibers as well as the method for the rotary coupling of optical fibers according to the invention or a preferred embodiment of it, can be advantageously applied, for example, in the steel and paper industry, in manufacturing robots in the automotive industry, in radar and senor applications, in which in particular a high data transfer rate together with a large immunity to noise is required.

REFERENCE NUMBER LIST

10 coupling device
12 rotation axis
14 first housing element
16 second housing element
18 fluid reception space
20 fitting cavity
22 fitting section
24 reception sleeve
26 reception channel
28 fiber guiding body
30 fiber guiding capillary
32 first fiber insertion opening
34 second fiber insertion opening
36 fluid filling opening
38 fluid channel
40 fluid filling lock
42 first fiber insertion channel
44 first fiber feed-through element
46 second fiber insertion channel
48 second fiber feed-through element
50 rotation insert
52 driver disk
54,56 deep-groove ball bearing
58 radial shaft seal ring
60 O-ring
62 driver disk
64 shim ring
66 fiber guiding contact
68 fiber core
110 first light wave conductor
112 first GRIN lens
114 second GRIN lens
116 second light wave conductor
α angle (swinging angle)
LF, LF1, LF2 optical fibers

The invention claimed is:
1. A coupling device for optical fibers comprising:
a first housing element and a second housing element, wherein the coupling device has a rotation axis around which the first and second housing elements can rotate relative to each other;

a first fiber positioning element for positioning a section of a first optical fiber relative to the first housing element;

a second fiber positioning element for positioning a section of a second optical fiber relative to the second housing element; and a fiber guiding body including a fiber guiding capillary, wherein the fiber guiding capillary extends continuously along the rotation axis from a first fiber insertion opening for the reception of an end section of the first optical fiber, to a second fiber insertion opening for the reception of an end section of the second optical fiber.

2. The coupling device according to claim 1, wherein the fiber guiding body is connected to the first housing element and can be rotated together with the first housing element relative to the second housing element along the rotation axis.

3. The coupling device according to claim 1, wherein the fiber guiding capillary is designed as a glass capillary tube.

4. The coupling device according to claim 1, wherein the fiber guiding capillary has a cross section perpendicular to the rotation axis that is different from a cross section of one of the end sections of the optical fibers that is accommodated in the fiber guiding capillary.

5. The coupling device according to claim 1, wherein the fiber guiding capillary has, at least partly or in sections, a cross section perpendicular to the rotation axis in such away that, when an optical fiber is inserted, a plurality of micro channels are formed for the reception and/or the transport at least one of a fluid and an immersion liquid between the optical fiber and the fiber guiding capillary, and such that a plurality of fiber guiding contacts are formed in which the optical fiber is in mechanical contact with the fiber guiding capillary.

6. The coupling device according to claim 5, wherein at least one of the fluid and the immersion liquid on the fiber guiding contacts, creates a lubrication between the optical fiber and the fiber guiding capillary.

7. The coupling device according to claim 1, wherein the fiber guiding capillary has an essentially square cross section perpendicular to the rotation axis.

8. The coupling device according to claim 1, wherein the cross section of the fiber guiding capillary widens and increases up to at least one of the first and the second fiber insertion opening.

9. The coupling device according to claim 1, wherein at least one of he first and the second housing element forms or encloses a fluid reception space that connects the fiber guiding capillary to exchange a fluid.

10. The coupling device according to claim 9, wherein in at least one Of the first and the second housing element, at least one fluid channel is constructed that connects the fluid reception space with at least one fluid filling opening.

11. The coupling device according to claim 1, wherein the first and the second housing elements can be moved relative to each other in a direction parallel to the rotation axis less than a distance selected from the group consisting of approximately 1 mm, approximately 500 µm, and approximately 100 µm.

12. The coupling device according to claim 1, wherein the length of the fiber guiding body parallel to the rotation axis is selected from the group consisting of in a range of approximately 1 mm to approximately 20 mm, in a range of approximately 2 mm to approximately 10 mm, in a range less than approximately 5 mm, and approximately 4 mm.

13. The coupling device according to claim 1, wherein the first and the second housing elements are connected to each other by at least one roller bearing.

14. The coupling device according to claim 1, wherein a driving device is included on at least one of the first and the second housing clement.

15. A method for the rotatable optical coupling of a first optical fiber with a second optical fiber comprising:

inserting an end section of the first optical fiber through a first fiber insertion opening into a fiber guiding capillary that extends continuously from the first-fiber insertion opening to a second fiber insertion opening; and inserting and end section of the second optical fiber into the fiber guiding capillary through the second fiber insertion opening.

16. The method according to claim 15, further comprising forming an optical coupling between end surfaces of the optical fibers inside the fiber guiding capillary without the interposition of optical elements for light beam widening.

17. The method according to claim 15, further comprising filling the fiber guiding capillary, at least in the region between the end sections of the optical fibers, with an immersion liquid having a refractive index that is adjusted to the refractive index of a fiber core of, at least one of the optical fibers.

18. The method according to claim 15, further comprising removing a fiber jacket at least partly from the end section of at least one of the first and the second optical fiber before it is inserted into the fiber guiding capillary.

19. The method according to claim 15, wherein at least one of the first and second fibers comprise a single-mode fiber.

\* \* \* \* \*

UNITED STATES PATENT AND TRADEMARK OFFICE
CERTIFICATE OF CORRECTION

| | |
|---|---|
| PATENT NO. | : 7,613,371 B2 |
| APPLICATION NO. | : 11/864378 |
| DATED | : November 3, 2009 |
| INVENTOR(S) | : Georg Ankerhold |

Page 1 of 1

It is certified that error appears in the above-identified patent and that said Letters Patent is hereby corrected as shown below:

In the Claims:

Claim 5, column 15, line 25, change "away" to -- a way --;
    column 15, line 27, change "transport" to -- transport of --.

Claim 9, column 15, line 45, change "he" to -- the --.

Claim 10, column 16, line 2, change "Of" to -- of --.

Claim 14, column 16, line 22, change "clement" to -- element --.

Claim 15, column 16, line 27, change "first-fiber" to -- first fiber --;
    column 16, line 29, change "and" to -- an --.

Signed and Sealed this

Ninth Day of February, 2010

David J. Kappos
*Director of the United States Patent and Trademark Office*